March 7, 1950 G. HERZOG 2,499,953
LINEAR INTEGRATION METER
Filed May 27, 1944
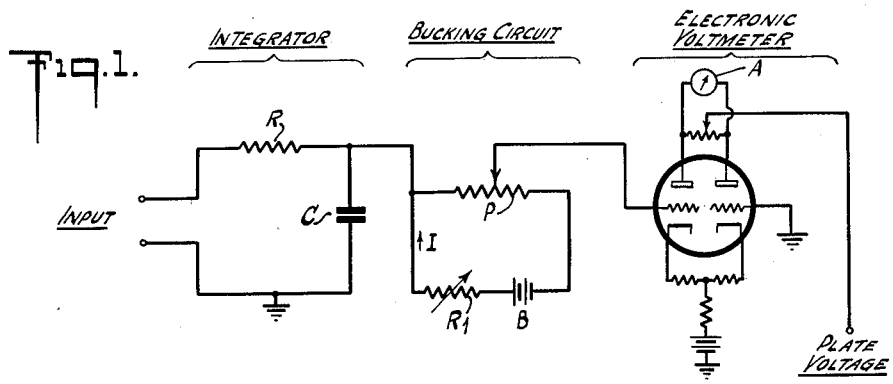
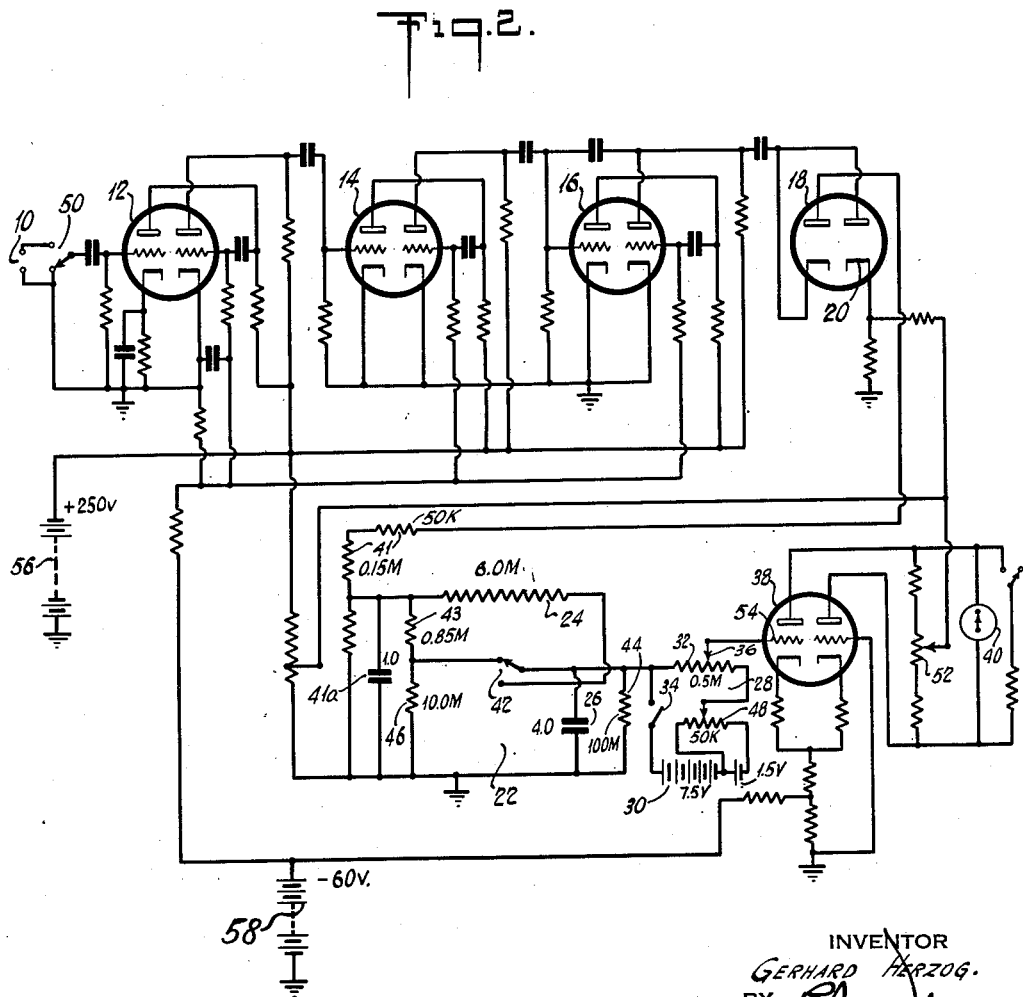
INVENTOR
GERHARD HERZOG.
BY
ATTORNEY Patented Mar. 7, 1950

2,499,953

UNITED STATES PATENT OFFICE 2,499,953

LINEAR INTEGRATION METER

Gerhard Herzog, Houston, Tex., assignor to The Texas Company, New York, N. Y., a corporation of Delaware Application May 27, 1944, Serial No. 537,682

3 Claims. (Cl. 250—83.6)

This invention relates to measuring instruments, and particularly to devices called integration meters, by means of which a direct indication can be had of the counting rate of a radiation detecting device such as a Geiger-Müller counter. The principal object of the invention is to provide an instrument for directly indicating the counting rate of a radiation detector without the necessity for using any mechanical counting devices, electronic scale circuits, or the measurement of time intervals during which measurements are made.

In the U. S. Letters Patent 2,277,756, granted to D. G. C. Hare, March 31, 1942, a method and an apparatus are disclosed for measuring the thickness of plates, pipe walls and the like from one side of the wall only and without the necessity of access to the other side. Penetrative radiation, such as gamma rays, from a source is directed into the object the thickness of which is to be measured and a radiation detector such as a device of the Geiger-Müller type, mounted near the source and at the same side of the object, measures the amount of radiation scattered within the material of the object and returned so as to be intercepted by the detector. The radiation intercepting the detector causes electrical pulses to be generated, the number of these pulses depending upon the intensity of the intercepted radiation and the latter depending upon the thickness of the object being examined. Other U. S. Letters patents granted to D. G. C. Hare disclose arrangements for determining the level of a liquid within a vessel and the densities or gravities of fluids in a vessel or which may be flowing through a pipe by measurement of scattered penetrative radiation.

As stated above, the thickness of a wall, the level of a liquid, or the density of a fluid may be measured by determining the number of discharges or pulses per second which occur in the radiation detector or counter. In the thickness measurements the frequency of the discharge varies from a few hundred up to about 2500 per second depending upon the wall thickness. Obviously no mechanical counting device can follow such high frequencies and therefore some means must be inserted to reduce the number of pulses by a fixed ratio. In one method of accomplishing this result, an electronic scale circuit is used; as an example, through the use of this scale circuit, out of 128 pulses the instrument retains the first 127 and passes only the 128th pulse to a mechanical counter attached to the output. Thus, for every count on the mechanical counter the gamma ray detector actually has discharged 128 times. The true counting rate N for a given wall thickness is obtained by observing the time, $t$ seconds, during which the mechanical counter moves C counts. Thus, one finds that:

$$N = 128 \, C/t \text{ counts per second}$$

The use of this equipment, therefore, for each determination of a wall thickness, requires the observation of the time $t$ and the corresponding number of counts C. These observations of the time and the corresponding number of counts require careful attention by one or more operators, and the amount of area covered, or in other words the number of thickness readings which can be taken in a given time, is limited.

In accordance with the present invention, an instrument has been devised which will indicate directly and linearly the counting rate N, and this instrument will be referred to herein as a "linear integration meter." In this instrument the pulses which come from the gamma ray detector or counter or from a preamplifier are passed through an electrical resistance and on to a condenser. A voltage from a source such as a B battery "bucks" the voltage on the condenser and a potentiometer is used to create a balance between the bucking circuit and the integrating or resistance-capacitance circuit. The potentiometer is varied until an indicating microammeter reads zero, and, from the scale divisions read off directly on the potentiometer, the counting rate is determined.

For a better understanding of the invention reference may be had to the accompanying drawing in which:

Figure 1 is a diagrammatic illustration of the electrical circuit in simplified form; and Figure 2 is an electrical diagram of a complete circuit.

As shown in Figure 1, in simplified form, the circuit of the instrument comprises substantially the integrator or resistance-capacitance circuit, the bucking circuit, and the meter circuit, the latter being shown as an electronic voltmeter.

The pulses from the radiation detector or from a suitable preamplifier, not shown, are connected to the input plug at the lefthand end in Figure 1. The integrator comprises the resistance R and the condenser C connected in series, the pulses from the detector being collected to form a charge on the condenser. The bucking circuit essentially comprises a source of direct current supply such as the battery B, a variable resistance $R_1$ and a potentiometer P. The battery B is arranged so that its voltage will be in opposition, i. e., so that it will "buck" the voltage on the condenser C, and by varying the potentiometer P the voltage from the battery B can be adjusted so that a microammeter A in the electronic voltmeter circuit will read zero, indicating that the bucking voltage and the condenser voltage are balanced. At that time the position of the slider or adjustable element on the potentiometer P will be a measure of the voltage on the condenser C and thus the counting rate of the radiation detector. The variable resistance $R_1$ serves to adjust the current to a constant value in case the voltage of the battery B decreases with its age. The battery B, of course, can be replaced with a standard cell, if desired. The voltmeter circuit will be described more completely with reference to Figure 2.

In the circuit shown in Figure 2, the pulses from the radiation detector or from a preamplifier, if one is used, are connected to the input plug 10, and the amplification stages indicated by the vacuum tubes 12, 14, and 16 serve to equalize the pulses as to their widths and amplitudes. At the output of amplifier stage 16 a double rectifier 18 is connected, this rectifier in one of its halves suppressing the positive part of each pulse because the cathode 20 of this half of the rectifier tube is connected to ground. The negative part of each pulse passes through the other half of the rectifier to the integrator illustrated generally at 22. Essentially, this integrator consists of a high resistance 24 of six megohms and a capacity or condenser 26 of four microfarads. As has been explained with reference to Figure 1, the capacity 26 is charged up through the high resistance 24 by the individual pulses and the voltage across the condenser 26 increases proportionately to the number of pulses per second and a measure of this voltage will therefore directly provide a measure of the counting rate.

The bucking circuit is shown generally at 28 and comprises a battery 30, a potentiometer 32 of .5 megohm, and a switch 34. The voltage drop across the potentiometer is connected in series with the voltage on the condenser 26, and the slide arm 36 of the potentiometer can be moved to such a point that the voltage drop along the resistance up to the point where the contact of the slide arm occurs is equal to the voltage across the condenser. The polarity of the battery 30 is arranged so that this voltage has opposite sign to that across the condenser 26. Thus, if the sliding contact 36 is moved to a point where the voltage across the condenser 26 and that across the potentiometer 32 are equal but of opposite sign, the potential on the sliding contact is exactly zero with respect to ground. If the counting rate of the radiation detector increases, the voltage across the condenser 26 increases and the sliding contact 36 has to be moved to the right in order that the two voltages shall remain equal. It is evident therefore that the position of the contact 36 is an indication of the counting rate.

This position can be read on a scale, not shown, which can be calibrated directly in counts per second. It is, of course, necessary to have an indicator which will show whether or not the sliding contact 36 is at such a point that its potential against ground is zero. A voltmeter used for this purpose must have a special property, i. e., its inner resistance must be extremely high and of the order of several hundred megohms. It has been found that an electronic voltmeter serves very well for this purpose, and such a device is shown generally at 38. In order to provide high stability with no zero drift in the instrument, a push-pull circuit is utilized, and as an indicator for the output of the voltmeter a microammeter 40 is connected across the plates of the vacuum tube which is shown as of the type 6F8G. One grid of the push-pull stage 38 is connected to ground, the other grid being connected to the sliding contact 36. If the sliding contact 36 is positioned in such a way that its potential against ground is zero, the two halves of the tube 38 deliver equal amounts of plate current and the meter 8 will show zero deflection.

Details of integrator 22

The resistances 41 and the condenser 41a comprise a first or preliminary integration circuit. A switch 42 provides two possibilities of connecting the four mfd. condenser 26 to the incoming pulses. When in the position shown in Figure 2, the pulses arrive at the condenser 26 through a rather low resistance 43 of 0.85 megohm. Thus the resistance 43 and the condenser 26 comprise a second integration circuit. The integration time, of course, is given by the product of the resistance and the capacity of the integrator circuit. With the switch 42 in its upper position, as shown in the drawing, the integration time is about 3.5 seconds. The condenser 26, therefore, in a rather short time, will acquire the voltage which corresponds to a given counting rate. Because of the statistical nature of the pulses from a gamma ray counter or detector, the voltage across the condenser 26 will fluctuate somewhat. This fluctuation can be reduced by using a longer integration time. Thus a third integration circuit is used, whereby, when the switch 42 is thrown to its lower position, the low resistance 43 is replaced by the resistance 24 of six megohms, the integration time is thereby increased to 24 seconds, and the voltage across the condenser 26 is quite stable. The introduction of the switch 42 into the circuit provides a means of having a long integration time for the actual measurement while still being able to measure within a rather short time.

The actual measuring procedure is as follows: The switch 42 is put into the upper position in which the integration time is 3.5 seconds. After this short time, the condenser reaches its average correct value and the switch is then thrown so as to introduce the higher integration time. Since the capacity of the condenser was already at its average correct value, one does not have to wait the full 24 seconds to make a final reading.

In the circuit of Figure 2, a 100 megohm resistor 44 is shown as shunting the condenser 26 in order to establish a fixed value for the unavoidable leakage across the condenser. The shunt 44 is smaller than the natural leakage of the condenser, which, therefore, can be neglected. If the switch 42 is in its lower position, the six-megohm resistance 24 and the 100 megohm resistance 44 act as a voltage divider for the voltage across the condenser 41a. In order that the voltage on the condenser 26 will be the same regardless as to whether the second or the third integration circuit is used, a voltage divider with an equal ratio is introduced into the circuit when switch 42 is in its upper position, this voltage divider consisting of the 0.85 megohm resistor 43 and the parallel combination of the ten-megohm resistor 46 and the resistor 44. Due to this symmetrical arrangement in both positions of switch 42, a change from the short time constant to the long time constant does not produce any change in voltage across the condenser 26. It has been found that with this arrangement the instrument can be brought quickly into operating condition.

Details of the bucking circuit 28

It will be noted that the bucking battery 30 of nine volts is divided into two parts. Across the last cell of 1½ volts is connected a potentiometer 48 of 50,000 ohms. By changing the position of the sliding arm on this potentiometer it can be arranged that the same current will always flow through the .5 megohm resistor or potentiometer 32. With increasing age of the battery 30, its voltage will naturally decrease and this change can be corrected by sliding the arm on the potentiometer 48 to the right.

The correct value for the setting of the potentiometer 48 can be checked by means of the voltmeter circuit 38. If the main input switch 50 is in the off or lower position, the voltage on the grid of the tube 38 will be due only to the current in the potentiometer 32. With the slide arm 36 at a fixed position, indicated on the scale, not shown, the meter 40 will show a certain deflection from zero of, for example, 40 divisions. If the voltage on the battery 30 subsequently decreases, the meter 40 will show a smaller deflection at the same dial setting. In that case the slide on the potentiometer 48 must be moved until the meter 40 will again read 40 divisions.

Details of meter circuit 38

As has been pointed out, the voltmeter consists of two vacuum tubes (shown as the double triode 38) which work one against the other. The currents of these two tubes must be exactly alike when the grids of both are at ground. This symmetry can be obtained by changing the position of the slide arm on a one thousand ohm potentiometer 52 which is connected between the two plates. In order to check for the symmetry, the grid 54 must also be at ground. This is accomplished by moving the slide 36 on the potentiometer 32 to its extreme left or zero position. The slide on the potentiometer 52 is then moved until the meter 40 shows zero deflection.

An instrument constructed in accordance with the circuit of Figure 2 has been checked as to its linearity. A graph was made showing the position of the slide 36 against the number of pulses per second and it was found that the plotted points lay substantially on a straight line.

Although the power for the instrument is shown as taken from the batteries 56 and 58, it is to be understood that a suitable vacuum tube power supply can be used.

Obviously many modifications and variations of the invention, as hereinbefore set forth, may be made without departing from the spirit and scope thereof, but only such limitations should be imposed as are indicated in the appended claims.

I claim:

1. A device for indicating the counting rate of a detector of penetrative radiation which comprises a resistance and a condenser connected in series with the output of said detector to form an integration circuit having a short time constant, a second resistance adapted to form with said condenser an integration circuit having a higher time constant, means for changing from one time constant to the other while simultaneously correcting for the leakage across said condenser, and means for measuring the voltage collected on said condenser due to the pulses of the detector, said means comprising a voltage connected so as to buck the voltage on the condenser, voltage dividing means for adjusting said bucking voltage to balance the condenser voltage and means for indicating the amount of adjustment of said voltage dividing means necessary to balance the condenser voltage.

2. A device for indicating directly the counting rate of a detector of penetrative radiation which comprises a resistance and a condenser connected in series with the output of said detector to form an integration circuit having a short time constant, a second resistance adapted to form with said condenser an integration circuit having a higher time constant, means for changing from one time constant to the other while simultaneously correcting for the leakage across said condenser, said means including a third resistance connected across said condenser and adapted to form with the first resistance and the leakage resistance of said condenser a voltage divider of equal ratio to that which is formed by the second resistance and the leakage resistance of said condenser, and means for measuring the voltage collected on said condenser due to the pulses of the detector, said means comprising a voltage connected so as to buck the voltage on the condenser, voltage dividing means for adjusting said bucking voltage to balance the condenser voltage and means for indicating the amount of adjustment of said voltage dividing means necessary to balance the condenser voltage.

3. A device for indicating directly the counting rate of a detector of penetrative radiation which comprises a resistance and a condenser, a fixed resistor connected in shunt across said condenser, said resistance and said condenser being connected in series with the output of said detector to form an integration circuit having a short time constant, a second resistance adapted to form with said condenser an integration circuit having a higher time constant, means for changing from one time constant to the other while simultaneously correcting for the leakage across said condenser, said means including a third resistance connected across said condenser and adapted to form with the first resistance and said fixed resistor a voltage divider of equal ratio to that which is formed by the second resistance and said fixed resistor, and means for measuring the voltage collected on said condenser due to the pulses of the detector, said means comprising a voltage connected so as to buck the voltage on the condenser, voltage dividing means for adjusting said bucking voltage to balance the condenser voltage and means for indicating the amount of adjustment of said voltage dividing means necessary to balance the condenser voltage, said indicating means including an electronic voltmeter circuit connected to said voltage dividing means, said voltmeter circuit containing a meter for indicating when the voltage collected on the condenser and the bucking voltage are balanced.

GERHARD HERZOG.

REFERENCES CITED

The following references are of record in the file of this patent:

UNITED STATES PATENTS

| Number | Name | Date |
|---|---|---|
| Re. 15,469 | Heising | Oct. 17, 1922 |
| 1,254,620 | Newman | Jan. 22, 1918 |
| 2,219,274 | Sherbatskoy | Oct. 22, 1940 |
| 2,362,164 | Silverman | Nov. 7, 1944 |

OTHER REFERENCES

"Journal of Research of the National Bureau of Standards," vol. 23, July 1939, Research paper RP1223, pp. 137 to 142.

Subra, Comptes Rendues, July 9, 1934, pp. 124, 125, 126.